United States Patent [19]

Shafranovsky et al.

[11] 4,256,674
[45] Mar. 17, 1981

[54] COUNTER-CURRENT GAS-LIQUID CONTACT APPARATUS

[76] Inventors: Alexandr V. Shafranovsky, ulitsa Molodezhnaya, 4, kv. 7, Balashikha Moskovskoi oblasti; Vitaly R. Ruchinsky, ulitsa Vavilova, 48/4, korpus 3, kv. 245, Moscow; Violetta V. Kurkovskaya, prospekt Mira, 99, kv. 12, Moscow; Viktor M. Olevsky, Leningradsky prospekt, 75a, kv. 91, Moscow; Jury A. Baskov, shosse Entuziastov, 156, kv. 20, Moscow; Vladimir K. Chubukov, Komsomolsky prospekt, 41, kv. 97, Moscow; Vladimir P. Gavrilin, Kastanaevskaya ulitsa, 27, korpus 5, kv. 25, Moscow; Nina M. Volkova, ulitsa Novatorov, 40, korpus 9, kv. 55, Moscow, all of U.S.S.R.

[21] Appl. No.: 80,494

[22] Filed: Oct. 1, 1979

[51] Int. Cl.³ .............................................. B01F 3/04
[52] U.S. Cl. ................................. 261/112; 202/158; 261/114 R
[58] Field of Search ............ 261/112, 113, 109, 114 R, 261/23 R; 202/158

[56] References Cited

U.S. PATENT DOCUMENTS

| 699,830 | 5/1902 | Best | 261/112 |
|---|---|---|---|
| 2,615,700 | 10/1952 | Dixon | 261/112 |
| 2,622,857 | 12/1952 | Vicard | 261/112 X |
| 3,493,216 | 2/1970 | Johnson | 261/112 X |
| 3,669,425 | 6/1972 | Copeland | 261/112 X |
| 3,722,185 | 3/1973 | Miczek | 261/112 X |
| 3,928,513 | 12/1975 | Leva | 261/113 |
| 4,117,049 | 9/1978 | Carrico | 261/114 R X |
| 4,124,069 | 11/1978 | Becker | 202/158 X |
| 4,202,846 | 5/1980 | Shafranovsky et al. | 261/114 R X |

FOREIGN PATENT DOCUMENTS

| 884342 | 8/1943 | France | 261/112 |
| 1010551 | 6/1952 | France | 261/112 |
| 250878 | 1/1978 | U.S.S.R. | 261/112 |

Primary Examiner—Richard L. Chiesa
Attorney, Agent, or Firm—Steinberg & Raskin

[57] ABSTRACT

Disclosure is made of a counter-current gas-liquid contact apparatus whose shell provided with gas and liquid admission and discharge branch pipes accommodates reflux plates arranged one above another with gaps in between; said reflux plates are made in the form of trays open at the top and assembled into packs; said trays have counter-opposed inclined rims and are arranged on a descending spiral so that there remain passages in the shell between the tray rims and the shell walls for the vertical flow of gas; said passages accommodate horizontal guide baffles which partition completely said passages and deflect the gas flow from one passage into another through the gaps between the trays in the direction from one inclined rim to the other.

15 Claims, 2 Drawing Figures

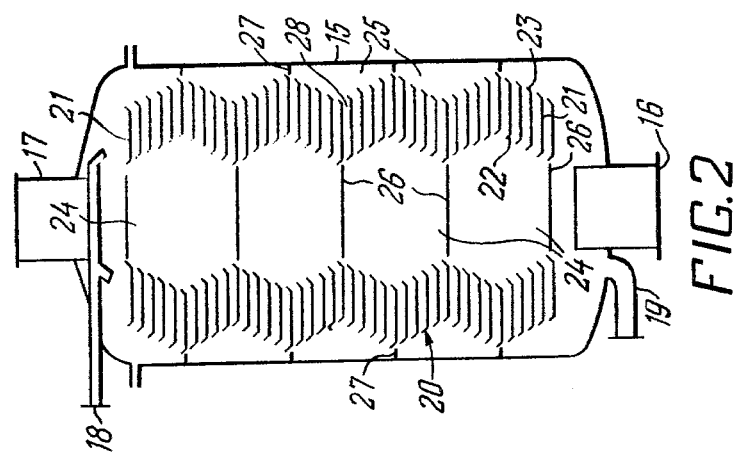
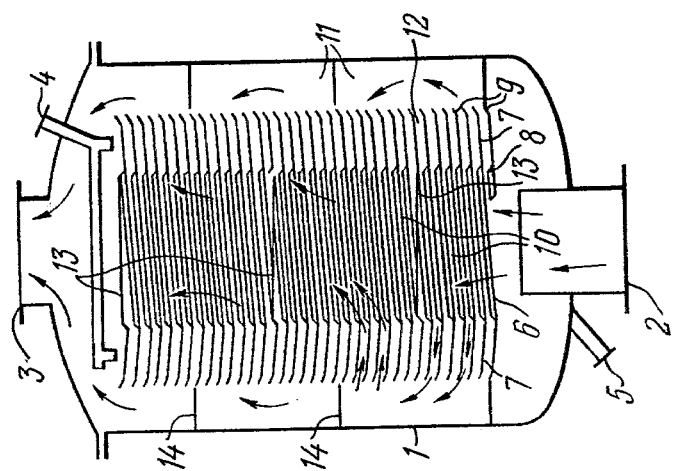

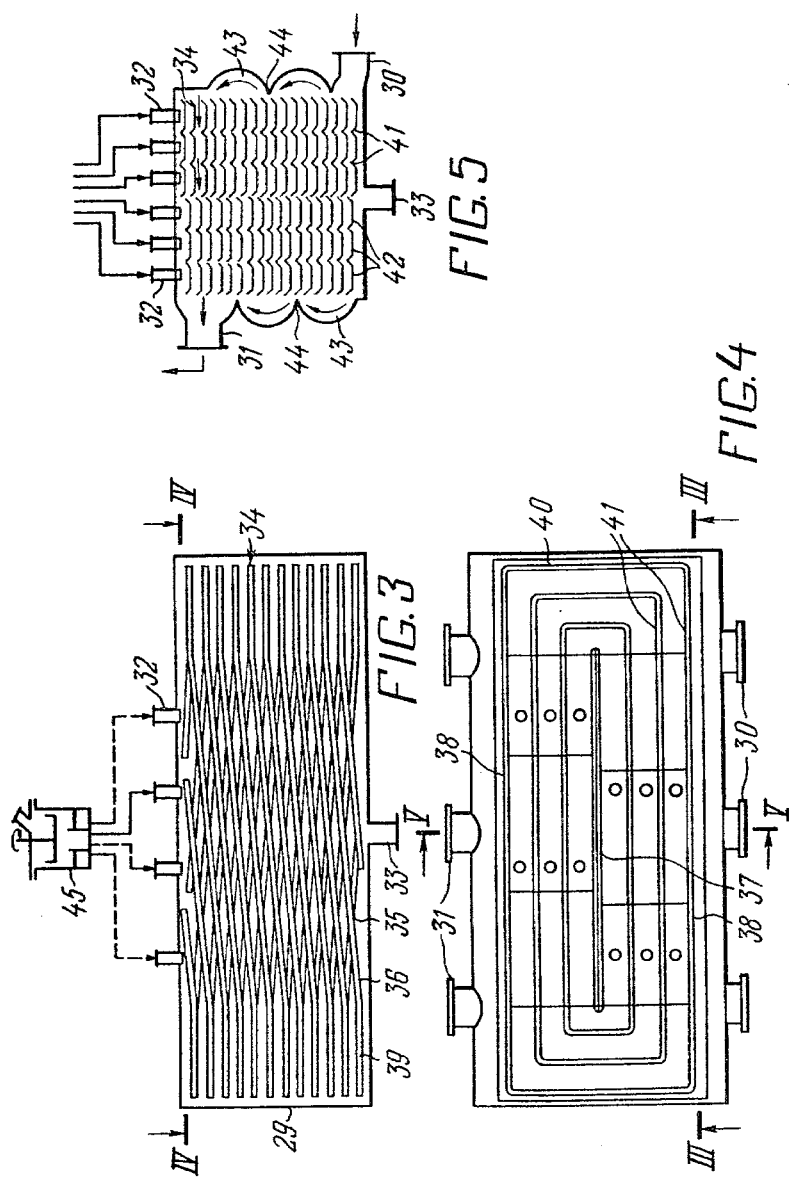

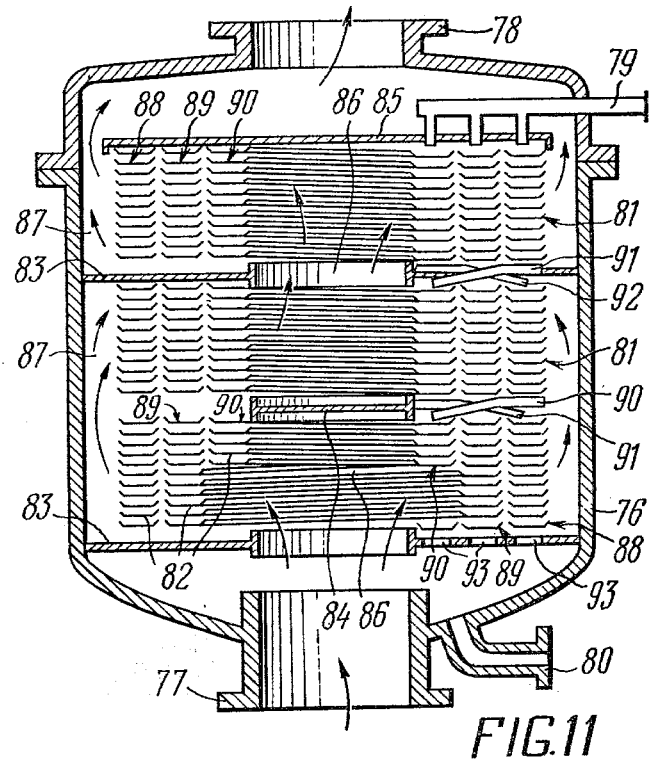
FIG.11
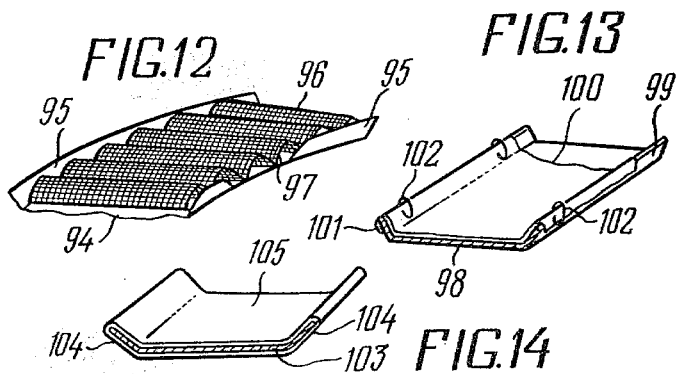
FIG.12  FIG.13
FIG.14

COUNTER-CURRENT GAS-LIQUID CONTACT APPARATUS

FIELD OF THE INVENTION

The present invention relates to equipment for mass-exchange processes between gas and a liquid film, for example rectification, absorption and, more particularly, to counter-current gas-liquid contact apparatuses.

BACKGROUND OF THE INVENTION

The preferred field of application of the present invention is rectification in vacuo of materials sensitive to elevated temperatures, e.g. lactams, fatty acids, polyhydric alcohols, high-boiling ethers, various oils, food and pharmaceutical products.

In view of the speedy development in the last decades of organic production we face a problem of providing rectifying apparatuses for the separation and refining of organic materials which are either intermediate or slot products. These materials are usually sensitive to the heat effect. Inasmuch as the temperature of the processed material in the course of rectification is equal to its boiling point which latter depends on the pressure in the apparatus, a general tendency is to rectify the heat-sensitive materials in vacuo.

In order to ensure a pressure which is, if possible, equally low in all the points of the rectification apparatus, these apparatuses must offer a very low hydraulic resistance to the passage of vapours. Most frequently the preferred type of the equipment in this case are gas-liquid film-type contact apparatuses.

Known in the prior art is a gas-liquid contact apparatus for mass exchange processes in the liquid-gas system (see, for example, Author's Certificate No. 250878, Cl. 12a 5 of Feb. 2, 1968, USSR) comprising a shell with branch pipes for the admission and discharge of gas and other branch pipes for the admission and discharge of liquid, horizontal refluxed plates arranged in the shell one above another with gaps between them, and means for delivering liquid on the reflux plates. The gas admission and discharge branch pipes are arranged horizontally on the same level. Each reflux plate has outflow holes at one of its ends, and each pair of vertically adjacent reflux plates has outflow holes located at the opposite ends. On each reflux plate the liquid moves from one of its ends having no outflow holes to its other end which has outflow holes. The gas passes through the gaps between the reflux plates from one of their ends to the other, contacting with the liquid film on said plates. Within the apparatus the liquid moves from the top down over a zigzag trajectory, flowing from one reflux plate onto another through outflow holes. If the liquid film on one of the reflux plates moves in a counter-current relative to the gas then on the adjacent overlying and underlying plates the liquid film moves in a forward flow relative to the gas.

A disadvantage of the prior art apparatus consists in its limited efficiency since it fails to comply with the principle of counter-current flow of the gas and liquid. This apparatus when used for rectification fails to provide more than one theoretical plate (theoretical separating stage).

Also known in the prior art is a counter-current gas-liquid contact apparatus (see, for example, U.S. Pat. No. 3,928,513, Cl. 261/113) comprising a shell with branch pipes for admitting gas into the lower portion of the apparatus, discharging it from the upper portion of the apparatus, admitting liquid into the upper portion of the apparatus and discharging it from its lower portion, reflux plates arranged in the shell one above another with gaps, and means for delivering the liquid onto the reflux plates. Each reflux plate is horizontal and has a plurality of outflow branch pipes.

During operation of the known apparatus the gas enters it through a branch pipe in the lower portion of the shell, crosses all the reflux plates, passing through the outflow pipes and contacting the liquid film on the upper surface of the reflux plates. Then the gas is discharged outside through a branch pipe in the upper portion of the shell. The liquid is delivered onto the uppermost plate through a branch pipe in the upper portion of the shell, spreads over it and drips down through the outflow pipes onto the underlying reflux plate also spreading over its entire surface in a thin layer (film). Flowing from one reflux plate onto another and wetting these plates, the liquid arrives into the lower portion of the apparatus wherefrom it is discharged outside through a branch pipe. Within the entire apparatus there is a counter-current between the gas and liquid which ensures a large number of theoretical plates in a single apparatus.

A disadvantage of this prior art apparatus consists in the limitations with respect to the efficiency of mass exchange (e.g. during rectification), said limitations being imposed by some design features of the apparatus.

Firstly, the surface of contact cannot be developed by decreasing the gaps between the reflux plates since said gaps must be wider than the height of the outflow pipes installed on the underside of said plates. Decreasing the gaps will interfere with the liquid flow from one reflux plate onto another and reduce the throughput of the apparatus with relation to the gas phase which may lead even to flooding of the apparatus.

Secondly, the gas flow in the prior art apparatus is insufficiently agitated during its contact with the liquid film.

Thirdly, entrainment of splashes may occur in the prior art apparatus because the drops and streams of liquid flowing from the outflow pipes of the overlying reflux plate on the underlying one may be entrained by the flow of gas. In this case a portion of the liquid returns to the overlying reflux plates which cuts down the efficiency of mass exchange.

Fourthly, the gas and the liquid film covering the horizontal reflux plate move in a counter-current relative to each other. At a certain sufficiently high velocity of gas this may lead to retardation of the liquid film flow on the horizontal reflux plates and, as a result, to inferior mass exchange characteristics of the apparatus.

Fifthly, even insignificant deviations of the apparatus from the vertical position erroneously made during installation break the continuity of the liquid film on the horizontal reflux plates and the resultant incomplete wetting of said plates impairs the efficiency of mass exchange in the apparatus.

SUMMARY OF THE INVENTION

An object of the invention is to provide a counter-current gas-liquid contact apparatus possessing a developed contact surface.

Another object of the invention is to provide a counter-current gas-liquid contact apparatus ensuring additional turbulization of the gas flow.

A further object of the invention is to provide a counter-current gas-liquid contact apparatus which is free from splash entrainment.

A still further object of the invention is to provide a counter-current gas-liquid contact apparatus which is free from retardation of the liquid film flow by the flow of gas.

An additional object of the invention is to provide a counter-current gas-liquid contact apparatus whose normal functioning is not disturbed even at small deviations of the apparatus from its vertical position.

And one more object of the invention is to provide a counter-current gas-liquid contact apparatus featuring a longer service life at minimum additional expenditures.

This is achieved by providing a counter-current gas-liquid contact apparatus comprising a shell with branch pipes for admitting gas into the lower portion of the shell and discharging it from the upper portion of the shell, also for admitting liquid into the upper portion of the shell and discharging it from the lower portion of the shell, reflux plates arranged in the shell one above another with gaps between them, and means for the delivery of liquid on the reflux plates wherein, according to the invention, the reflux plates have the form of trays open at the top and assembled into at least one separate pack having counter-opposed inclined rims and arranged along a descending spiral in such a manner that between the inclined rims of said trays and the walls of the shell there remain passages for the vertical flow of gas, said passages accommodating substantially horizontal guide baffles which partition said passages completely and deflect the gas flow from one of said passages into another through the gaps between the trays in the direction from one inclind rim of the trays to the other.

In such a counter-current gas-liquid contact apparatus the gaps between the adjacent trays can be made sufficiently small without interfering with its normal operation. And the decreased gaps between the trays permit increasing the contact surface per unit of the apparatus volume.

Owing to the fact that the gas flow moves perpendicularly to the trays, the inclined rims of said trays cause a certain perturbation in the nature of gas flow both due to their sharp edges and due to curving of the trajectory of the gas flow in a short zone between the inclined rims of the trays. This ensures a certain turbulization of the gas flow when the latter contacts the liquid film.

Besides, the reflux plates of the disclosed apparatus have no holes from which the liquid could flow and be disintegrated into streams or drops which cross the gaps between said plates. And the absence of drops and streams of liquid on the path of the gas flow reduces substantially the possibility of splash entrainment in the apparatus.

Inasmuch as the gas moves perpendicularly to the trajectory of the liquid flowing down in the form of a film along the tray, retardation of the liquid film flow by the gas flow is excluded.

In view of the fact that the trays are arranged on a descending spiral, i.e. at a certain angle to horizontal and that the width of the trays is negligible in comparison with their length, small deviations of the apparatus from verticality do not interfere with normal flow of the film over the trays and the latter are fully wetted.

This raises the efficiency of mass exchange in the apparatus.

It is desirable that the width of the passages for the vertical flow of gas should vary along the height of the apparatus.

This will permit the velocity of the vertical gas flow to be maintained uniform throughout the height of the passage regardless of the fact that the amount of gas moving through the passage either grows or diminishes because of its movement in the horizontal direction through the gaps between the trays from one passage into another. As a result, the apparatus has no "bottlenecks" where the velocity of gas might exceed the preset limit and the hydraulic resistance of the apparatus diminishes.

It is also recommended to dispose several individual packs of trays in the horizontal section of the apparatus shell.

This will improve the reliability of the apparatus in case of some deviations from verticality that could have happened during its vertical installation. The liquid is localized in several packs without accumulating excessively near one of the shell walls.

It is practicable that the packs should have the shape of sectors in plan with the narrower portion of said sectors directed into the apparatus and that installed along the height of the apparatus between the packs of trays arranged at different levels should be central sleeves for collecting the liquid from the overlying packs and redistributing it among the underlying packs.

This makes it possible to develop the contact surface per unit of apparatus volume.

It is also possible to arrange the trays in one and the same pack along at least two descending spirals of different diameters so that the spiral of a larger diameter envelops the spiral of a smaller diameter.

This will increase the efficiency of an individual pack of trays due to additional turbulization of the gas flow within the limits of a single pack.

It is desirable that the descending spirals of different diameters should be oriented so that the adjacent spirals are wound in opposite directions.

This will improve the uniformity of distribution of the gas phase through the gaps of the trays in a single pack and thus will raise the efficiency of the tray pack.

It is desirable to arrange several packs along the height of the apparatus and to provide overflow devices between the packs to deliver the liquid flowing from the outer spiral of the overlying pack onto the inner spiral of the underlying pack and vice versa.

This will raise additionally the efficiency of the tray packs due to an increase in the average motive force of the process of mass exchange between the gas phase and the liquid film.

It is practicable that a corrugated sieve band should be located in the gaps between the trays; this band should be made and oriented in such a manner that its corrugations extend in the direction from one inclined rim of the trays to the opposite rim and the lower ridges of said corrugations contact the refluxed surface of the trays.

This develops additionally the contact surface per unit of apparatus volume. The lower ridges of the corrugations are immersed into the liquid film and the latter contacts many times on its path with said ridges. The capillary forces ensure wetting of that portion of the corrugated sieve band which is not immersed into the liquid film.

It is also desirable that at least the internal (refluxed) surface of the trays should be coated with a protective film of a polymer material, e.g. polytetrafluoroethylene.

Inasmuch as the thickness of the protective film can be quite small and the shape of the trays is extremely suitable for placing and attaching the protective film thereto, the life of the apparatus can be prolonged by reducing the corrosion of the reflux plates with a comparatively low expenditure of additional materials (i.e. protective film).

BRIEF DESCRIPTION OF THE DRAWINGS

Now the invention will be described in detail by way of examples with reference to the accompanying drawings in which:

FIG. 1 is a longitudinal section of the counter-current gas-liquid contact apparatus according to the invention;

FIG. 2 is a longitudinal section of a version of the counter-current gas-liquid contact apparatus according to the invention;

FIG. 3 is a longitudinal section of still another version of the counter-current gas-liquid contact apparatus according to the invention;

FIG. 4 is a section taken along line IV—IV in FIG. 3;

FIG. 5 is a section taken along line V—V of FIG. 4;

FIG. 11 is a longitudinal section of a further version of the counter-current gas-liquid contact apparatus according to the invention;

FIG. 12 is an isometric view of an element of the tray with a partial cutout (on tray rim) corresponding to one of the possible versions of the counter-current gas-liquid contact apparatus according to the invention;

FIG. 13 is an isometric view of an element of the tray in another version of the counter-current gas-liquid contact apparatus;

FIG. 14 is an isometric view of an element of the tray corresponding to a still further version of the counter-current gas-liquid contact apparatus.

DETAILED DESCRIPTION OF THE DRAWINGS

Figure 6:
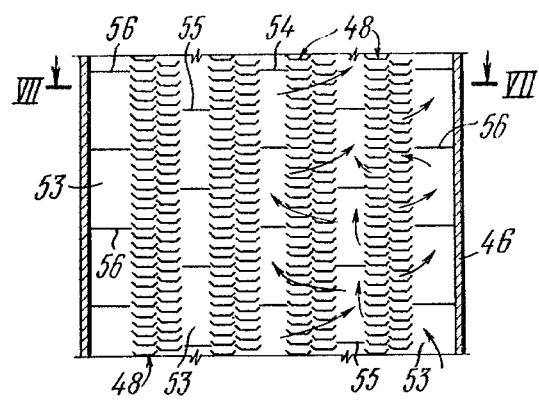
FIG. 6 is a longitudinal section of an additional version of the counter-current gas-liquid contact apparatus according to the invention.

The counter-current gas-liquid contact apparatus comprises a vertical cylindrical shell (FIG. 1) provided with a lower gas-admission branch pipe 2, an upper gas-discharge branch pipe 3, an upper liquid admission branch pipe 4 and a lower liquid discharge branch pipe 5. The shell 1 accommodates a pack 6 of reflux plates in the form of trays 7 arranged on a descending double-start spiral. The upper branch pipe 4 is a distributing one; it supplies liquid onto the upper portions of the trays 7 forming the double-start spiral. The trays 7 have counteropposed inner and outer inclined rims 8 and 9. The inclination angle of said rims to horizontal is 45° approximately. The inner inclined rims 8 are directed into the.pack 6 while the outer inclined rims 9 are directed toward the walls of the shell 1. Between the inner inclined rims 8 there are central passages 10 while between the outer inclined rims 9 and the walls of the shell 1 there are peripheral passages 11 for the passage of the gas flow in a vertical direction. The passages 10 and 11 are in communication with one another through the gaps 12 between the trays 7. The central passages 10 and peripheral passages 11 accommodate horizontally-disposed round guide baffles 13 and circular guide baffles 14, respectively. The different guide baffles 13 and 14 are staggered along the height of the shell 1 in order that the gas flow moving from the lower portion of the shell 1 into its upper portion would cross repeatedly the gaps 12 between the trays 7, passing from passages 10 into passages 11 and vice versa on a trajectory which is perpendicular to the trays 7. During this process the inclined rims 8 and 9 of the trays 7 must ensure directional dripping of the liquid film under the force of gravity strictly along the trays 7, i.e. on a spiral trajectory. Besides, the inclined rims 8 and 9 are intended to bend somewhat the trajectory of the gas flow in the gaps 12 in the zone located between the rims 8 and 9; this should conduce to turbulization of the gas phase and improvement of the coefficients of mass transfer.

The outer edges of the trays 7 directed to the walls of the apparatus shell 1 are arranged higher than the opposite edges directed into the pack 6. This is done to prevent the liquid film from accumulating at the outer inclined rims 9 due to the centrigural forces. This eliminates the local resistances to the gas flow at the entrance into the gaps 12 between the trays 7.

In spite of the fact that the liquid film and gas move in a cross wise pattern in each gap 12, the entire apparatus still retains its counter-current principle of liquid and gas movement.

The counter-current gas-liquid contact apparatus in the embodiment illustrated in FIG. 1 functions as follows.

The liquid is delivered through a distributing branch pipe 4 on the upper portions of the trays 7 and then flows down by gravity in the form of a film along the trays 7 over a descending spiral. From the lower trays 7 the liquid flows into the lower portion of the apparatus from where it is discharged through the branch pipe 5. The gas enters the apparatus through the lower branch pipe 2 and passes into the central passage 10. The lowermost circular guide baffle 13 deflects the gas flow through the gaps 12 between the trays 7 into the peripheral passage 11. The overlying circular baffle 14 deflects the gas flow again into the central passage 10 but already in that portion of said passage which is located above the lowermost round baffle 13. The trajectory of the gas flow is shown in FIG. 1 by arrows. In the gaps 12 between the trays 7 the gas contacts the liquid film which wets the bottoms of the trays 7.

In another embodiment of the gas-liquid contact apparatus the width of the passages for the vertical flow of gas varies along the height of the apparatus.

The vertical cylindrical shell 15 (FIG. 2) is provided with a lower gas admission branch pipe 16, an upper gas discharge branch pipe 17, an upper distributing liquid admission pipe 18 and a lower liquid discharge pipe 19. The shell 15 accommodates a separate pack 20 of trays 21 provided with inner 22 and outer 23 inclined rims and arranged over a double-start descending spiral. Provided between the inner inclined rims 22 is a central passage 24 while between the outer inclined rims 23 and the walls of the shell 15 there are peripheral passages 25 for the vertical flow of gas. The central passage 24 is partitioned by round guide baffles 26. The peripheral passage 25 is partitioned by guide baffles 27. The passages 24 and 25 are in communication with each other through gaps 28 between the trays 21.

A distinguishing feature of the apparatus lies in that, owing to the selected arrangement of the trays 21 the width of the central passage 24 varies along the height of the apparatus on the portions of the pack 20 located between the guide baffles 26 and 27. The width of the peripheral passage 25 varies simultaneously but in the reverse direction. This is done in order to prevent substantial changes in the linear velocity of the vertical gas flow in the passages 24 and 25 along their height in spite of the repeated movement of gas through the gaps 28 from the passages 24 into the passages 25 or vice versa.

This gas-liquid apparatus functions similarly to that illustrated in FIG. 1.

In another embodiment of the counter-current gas-liquid contact apparatus the guide baffles are made in the form of inner projections on the walls of the apparatus shell and the pack of trays is rectangular in plan.

The apparatus comprises a box-shaped shell 29 (FIGS. 3-5) provided with lower gas admission branch pipes 30, upper gas discharge branch pipes 31, upper liquid admission branch pipes 32 and a lower liquid discharge pipe 33. The shell 29 accommodates a pack 34 of trays 35 arranged in the form of a quadruple spiral. The trays consist of interconnected straight inclined portions 36 with inner inclined rims 37 and outer inclined rims 38, and short horizontal portions 39 provided with outer rims 40. The trays 35 have longitudinal ridges 41 which divide said trays 35 into three parallel channels 42. This layout of the trays 35 is intended to improve the distribution of liquid across their width. Besides, longitudinal ridges 41 ensure additional turbulization of the gas flow moving from the outer inclined rims 38 to the inner inclined rims 37 of the trays 35 (or in the reverse direction).

A distinguishing feature of this apparatus lies also in that the inner inclined rims 37 of the trays 35 adjoin fully or partly one another and there remains no passage between them for the vertical flow of gas. However, such passages are provided between the outer inclined rims 38 and the walls of the shell 29. These passages 43 have a cross section varying along the height of the apparatus. The function of guide baffles which bend the trajectory of the gas flow is performed by the inner projections 44 of the shell 29. These projections 44 arranged in a staggered order on both sides of the pack 34 ensure repeated crossing of said pack by the flow of gas moving in the apparatus from the lower branch pipes 30 to the upper branch pipes 31.

The liquid is delivered into all the passages 42 of the trays 35 arranged along the four-start spiral through twelve branch pipes 32 (one for each separate passage 42 of each start of the spiral). The total flow of liquid is divided by a conventional distributing device 45 of, say, rotary type into twelve independent streams.

This embodiment of the apparatus functions as follows.

The liquid flows through the branch pipes 32 to the uppermost portions of the trays 35. Under the effect of the force of gravity the liquid spreads in the form of a film over the bottoms of the trays 35 and drips down along the descending spiral into the lower part of the apparatus from where it is discharged through the branch pipe 33. The gas enters the apparatus through the branch pipe 30 and leaves it through the branch pipe 31. Inside the apparatus the gas flow crosses many times the pack 34 of the trays 35 (shown by arrows), contacting the liquid film.

In another embodiment of the invention more distinguishing features of the invention are realized.

The apparatus comprises a vertical cylindrical shell 46 (FIGS. 6-8) accommodating in its cross section several individual packs 47 (FIG. 7) of trays 48 which are arranged in the form of a multiple spiral. The trays 48 consist of inclined straight sections 49 (FIGS. 7, 8) with inner inclined rims 50 (FIG. 7) and outer inclined rims 51. The short horizontal portions 52 adjoin the side surface of the shell 46. Shown in FIG. 6 is only a part of the apparatus therefore it does not show the liquid admission and discharge pipes, and the means for the delivery of liquid into the packs 47. Between the packs 47 there are passages 53 for the vertical flow of gas which accommodate guide baffles 54, 55, 56 intended to ensure repeated crossing of the packs by the flow of gas (shown by arrows).

Figure 7:
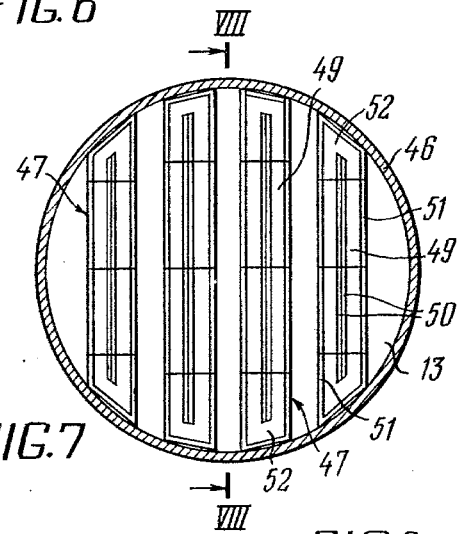
FIG. 7 is a section taken along line VII—VII in FIG. 6.
Figure 8:
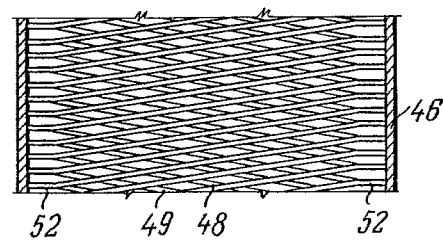
FIG. 8 is a section taken along line VIII—VIII in FIG. 7.

The operating principle of the apparatus in the embodiment shown in FIGS. 6-8 does not require any special explanations. In this case too the gas flow crosses repeatedly the packs 47 of trays 48 (shown by arrows).

In another realization of the counter-current gas-liquid contact apparatus the packs of trays in plan have the shape of sectors whose narrower end is directed into the apparatus.

Figure 9:
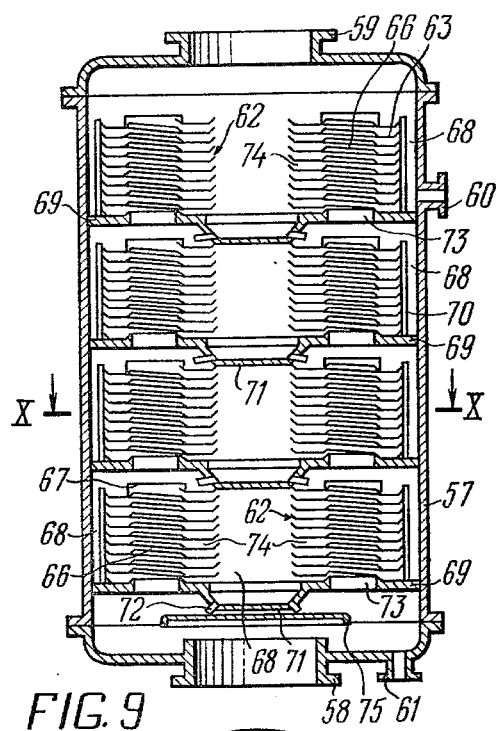
FIG. 9 is a longitudinal section through one more version of the counter-current gas-liquid contact apparatus according to the invention.
Figure 10:
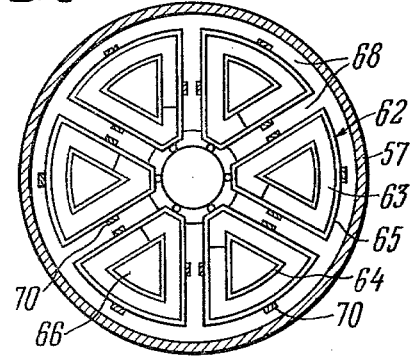
FIG. 10 is a section taken along line X—X in FIG. 9.

The vertical cylindrical shell 57 (FIG. 9) of the apparatus has a lower gas admission branch pipe 58, an upper gas discharge branch pipe 59, an upper liquid admission branch pipe 60 and a lower liquid discharge branch pipe 61. The shell 57 accommodates the packs 62 of trays 63 arranged along a single-start spiral. The inner inclined rims 64 and outer inclined rims 65 of the trays 63 have the shape of a sector in plan whose narrower end is directed into the apparatus.

The inner inclined rims 64 of each pack 62 define the central passage 66 which is closed on the top with a guide baffle 67 in the form of a cap.

Between the outer inclined rims 65 of the trays 63 and the walls of the shell 53 there remain outer passages 68 for the vertical flow of gas. These passages 68 are partitioned along the height of the apparatus by baffles 69. The latter also function as supporting plates on which the packs 62 of trays 63 are mounted with the aid of longitudinal plates 70.

Installed in the centre of guide baffles 69 are central sleeves 71 provided with discharge branch pipes 72. The guide baffles 69 have holes 73 for the flow of gas from the passages 68 into the passages 66 of the packs 62.

The passages 66 and 68 intercommunicate not only through the holes 73 in the guide baffles 69 but also through the gaps 74 between the trays 63.

The uppermost reflux packs 62 are intended not as much for mass exchange as for separating splashes from the gas flow.

Installed in the shell 57 above the lower gas admission branch pipe 58 is a deflecting baffle 75 which prevents the ingress of liquid into the pipe 58.

A distinguishing operating feature of this apparatus lies in that the liquid streams dripping down from the packs 62 of trays 63 are collected in the sleeves 71 from which the liquid is uniformly distributed through discharge branch pipes 72 among the underlying packs 62.

In a further version of the counter-current gas-liquid contact apparatus the packs of trays comprise several descending spirals of different diameters as shown in FIG. 11.

In this version the apparatus comprises a vertical cylindrical shell 76 with a lower gas admission branch pipe 77, an upper gas discharge pipe 78, an upper distributing branch pipe 79 for admitting the liquid and delivering it onto the reflux plates, and a lower branch pipe 80 for discharging the liquid from the apparatus. Installed inside the shell 76 along the height of the apparatus are three packs 81 of trays 82 with guide baffles 83, 84, 85 between them, said baffles being intended to partition the central 86 and peripheral 87 passages. The distinguishing feature of this version of the apparatus consists in that each pack 81 of trays 82 comprises several (in this case three) descending spirals 88, 89, 90 of different diameters which ensures additional turbulization of the gas phase. In this case the adjacent spirals of the pack 81 are wound in opposite directions (see the lower pack 81 shown with a partial cutout where it is evident that the spirals 89 and 90 are wound in opposite directions). This is aimed at improving the uniformity of distribution of the gas flow in the packs 81. Here the spirals 88–90 are of the single-start type.

Provided between the different packs 81 are overflow devices in the form of grooves 91 and 92. The groove 91 traps the liquid dripping down from the lower end of the single-start spiral 88 of the overlying pack 81 and delivers it on the upper end of the single-start spiral 90 of the underlying pack 81. Similarly, the groove 92 ensures the transfer of the liquid from the spiral 90 to the underlying spiral 88. There are no special overflows between the spirals 89 of the adjacent packs 81 so that the liquid flows from one spiral 89 to another simply by gravity.

The lowermost guide baffle 83 has holes 93 for the liquid flowing from the lower ends of the spirals 88, 89, 90 into the lower part of the apparatus.

The apparatus illustrated in FIG. 11 functions as follows. The source liquid is distributed in equal streams through the branch pipe 79 over the spirals 88–90 from the uppermost pack 81. From the lower end of the spiral 88 of this pack 81 the liquid flows through the groove 91 onto the inner spiral 90 of the underlying pack. From the lower end of the spiral 90 of the uppermost pack 81 the liquid flows through the groove 92 onto the outer spiral 88 of the underlying pack 81. From the intermediate spiral 89 the liquid flows direct onto a similar spiral 89 of the underlying pack 81. The gas flow crosses the packs 81, contacting the liquid film (shown by arrows).

In another realization of the counter-current gas-liquid contact apparatus the gaps between the trays accommodate a corrugated sieve band.

For better clarity, FIG. 12 shows only an element of the tray 94 with inclined rims 95, accommodating the corrugated sieve band 96. One of the rims 95 is shown with a cutout on a small portion thereof. The crimps of said band 96 are directed from one rim 95 of the tray to its opposite rim 95. The lower ridges 97 of the corrugated sieve band 96 touch upon the refluxed surface, i.e. the bottom of the trays 94.

In another version at least the inner surface of the trays may be coated with a protective polymer film. The tray 98 (FIG. 13) with inclined rims 99 is coated with a protective polytetrafluoroethylene (teflon) film 100. The edges 101 of the protective film 100 are bent over the inclined rims 99 of the tray 98. The protective film 100 is fixed on the tray 98 by fasteners 102 made of a corrosion-resistant material. Thus, the protective film 100 protects only those portions of the tray 98 which are in contact with the liquid, i.e. are in the worst operating conditions from the standpoint of corrosion.

In a further version of the apparatus the entire surface of the tray is protected against the effect of aggressive medium. The tray 103 (FIG. 14) with inclined rims 104 is enclosed into a case of protective film 105. This film 105 can be secured on the tray 103 by glueing. The layer of glue is located between the outer surface of the tray 103 and the inner surface of the case of protective film 105 which rules out its dissolution under the effect of the working fluid.

What is claimed is:

1. A counter-current gas-liquid contact apparatus comprising a shell; branch pipes for admitting gas into the lower portion of said shell and discharging it from the upper portion of said shell; branch pipes for admitting liquid into the upper portion of said shell and discharging it from the lower portion of said shell; reflux plates installed in said shell one above another with gaps in between; said reflux plates are made in the form of trays open at the top, assembled into at least one separate pack, provided with counteropposed inclined rims and arranged on a a descending spiral so that there remain passages in said shell between the rims of said trays and the shell walls for the vertical flow of gas; guide baffles which are located in said passages substantially horizontally, which partition completely said passages and deflect the gas flow from one of said passages into another through the gaps between said trays in the direction from one of said rims of said trays to the other; means for delivering the liquid onto said reflux plates.

2. A counter-current gas-liquid contact apparatus according to claim 1 wherein the width of said passages for the vertical flow of gas varies steadily along the height of the shell in the zones of the pack located between the vertically adjacent guide baffles.

3. A counter-current gas-liquid contact apparatus according to claim 1 wherein arranged horizontally in said shell are several individual packs of said trays.

4. A counter-current gas-liquid contact apparatus according to claim 3 wherein said packs of trays have in plan the shape of sectors whose narrow portions are directed into the shell and wherein installed along the height of said shell between said packs of trays arranged at different levels are central sleeves for collecting the liquid from the overlying packs and redistributing it among the underlying packs.

5. A counter-current gas-liquid contact apparatus according to claim 4 wherein said packs of trays comprise several descending spirals of different diameters arranged so that the spiral of a larger diameter envelops the spiral of a smaller diameter.

6. A counter-current gas-liquid contact apparatus according to claim 5 wherein said descending spirals of different diameters are oriented so that the adjacent spirals are wound in opposite directions.

7. A counter-current gas-liquid contact apparatus according to claim 5 wherein located between said adjacent packs of trays arranged at different levels are overflow devices for delivering the liquid flowing down from said outer spiral of said overlying pack on said inner spiral of said underlying pack and, conversely, for delivering the liquid flowing down from said inner spiral of said overlying pack on said outer spiral of said underlying pack of trays.

8. A counter-current gas-liquid contact apparatus according to claim 3 wherein said packs of trays comprise several descending spirals of different diameters arranged so that the spiral of a larger diameter envelops the spiral of a smaller diameter.

9. A counter-current gas-liquid contact apparatus according to claim 8 wherein said descending spirals of different diameters are oriented so that the adjacent spirals are wound in opposite directions.

10. A counter-current gas-liquid contact apparatus according to claim 8 wherein located between said adjacent packs of trays arranged at different levels are overflow devices for delivering the liquid flowing down from said outer spiral of said overlying pack on said inner spiral of said underlying pack and, conversely, for delivering the liquid flowing down from said inner spiral of said overlying pack on said outer spiral of said underlying pack of trays.

11. A counter-current gas-liquid contact apparatus according to claim 1 wherein said packs of trays comprise several descending spirals of different diameters arranged so that the spiral of a larger diameter envelops the spiral of a smaller diameter.

12. A counter-current gas-liquid contact apparatus according to claim 11 wherein said descending spirals of different diameters are oriented so that the adjacent spirals are wound in opposite directions.

13. A counter-current gas-liquid contact apparatus according to claim 11 wherein located between said adjacent packs of trays arranged at different levels are overflow devices for delivering the liquid flowing down from said outer spiral of said overlying pack on said inner spiral of said underlying pack and, conversely, for delivering the liquid flowing down from said inner spiral of said overlying pack on said outer spiral of said underlying pack of trays.

14. A counter-current gas-liquid contact apparatus according to claim 1 wherein located in the gaps between said trays is a corrugated sieve band made and arranged in such a manner that its corrugations extend in the direction from one inclined rim of trays to the opposite rim of trays and the lower ridges of said corrugations contact the refluxed surfaces of trays.

15. A counter-current gas-liquid contact apparatus according to claim 1 wherein at least the inner surface of said trays is coated with a protective film of a polymer material, e.g. polytetrafluoroethylene.

* * * * *